United States Patent [19]

Yamanaka

[11] Patent Number: 5,175,659
[45] Date of Patent: Dec. 29, 1992

[54] MECHANISM FOR ADJUSTING THE POSITION OF THE MAGNETIC HEAD OF A VTR

[75] Inventor: Takashi Yamanaka, Tokyo, Japan

[73] Assignee: Tanashin Denki Co., Ltd., Tokyo, Japan

[21] Appl. No.: 557,522

[22] Filed: Jul. 24, 1990

[30] Foreign Application Priority Data

Mar. 2, 1990 [JP] Japan .................................. 2-51152

[51] Int. Cl.5 ............................................. G11B 5/56
[52] U.S. Cl. ................................................. 360/109
[58] Field of Search ............................ 360/109, 84-85

[56] References Cited

U.S. PATENT DOCUMENTS

| 4,081,848 | 3/1978 | Blanding | 360/109 |
| 4,087,634 | 5/1978 | Fraser | 360/109 X |
| 4,412,262 | 10/1983 | Schultz | 360/109 |
| 4,491,890 | 1/1985 | Rudi . | |
| 4,589,040 | 5/1986 | Kawase | 360/109 |
| 4,661,864 | 4/1987 | Kuwajima . | |
| 4,697,077 | 9/1987 | Weber | 360/109 |

FOREIGN PATENT DOCUMENTS 89-38736  11/1989  Japan .

Primary Examiner—A. J. Heinz
Attorney, Agent, or Firm—Vidas & Arrett

[57] ABSTRACT

A mechanism for adjusting the position of the magnetic head of a VTR is characterized in that the horizontal position adjustment means comprises a horizontal position adjustment body rotatable relative to a chassis about an axis parallel to a supporting shaft and having the peripheral surface thereof parallel to the axis, the distance between the peripheral surface and the axis being gradually changed with the rotational direction of the horizontal position adjustment body; and a resilient means for resiliently pressing a portion of a up/down movable plate on the peripheral surface of the horizontal position adjustment body.

4 Claims, 3 Drawing Sheets

MECHANISM FOR ADJUSTING THE POSITION OF THE MAGNETIC HEAD OF A VTR

BACKGROUND OF THE INVENTION

The present invention relates to a mechanism of simple structure for adjusting the position of the magnetic head of a VTR, which facilitates the adjustment of the position of the magnetic head relative to a rotation head cylinder and improves the assembly precision.

There has been disclosed in Japanese Utility Model Publication No. 89-38736 a mechanism for adjusting the position of the magnetic head of a VTR which comprises a vertical position adjustment means for confirming the control head (hereinafter referred to as magnetic head) to control the tracking between the sound read/write head and the rotation head and a video recording track to the tape running height, and a horizontal position adjustment means for adjusting the distance between the magnetic head and the rotation head cylinder. In this mechanism, the operation of the vertical position adjustment means does not affect the horizontal position adjustment means.

In such a conventional vertical position adjustment means, there is controlled the pivoting of a head mounting plate that is pivotably mounted on a supporting shaft and upwardly and downwardly movable by means of a pin. In addition, another plate mounted on the supporting plate and upwardly and downwardly movable is biased in one direction by the force of a compression spring that is received by a nut threadedly engaged with the supporting shaft. By means of this nut is adjusted the vertical position. The compression spring presses against the surface of a tapered nut threadedly engaged with the another plate and the head mounting plate. Moreover, because the head mounting plate and the other plate vertically move integrally together even if the vertical position of the magnetic head is adjusted by means of the tapered nut, there is caused no change in the relative position between the head mounting plate and the tapered nut performing the horizontal position adjustment. However, the construction of such a mechanism is complicated.

Moreover, in such a conventional vertical position adjustment mechanisms, because a metal cylindrical member is fixed on one side of the head mounting plate made of a metal by means of a self-locking nut and the magnetic head is mounted on the other side of the head mounting plate so that the self locking nut causes to deteriorate the perpendicularity between the cylindrical member and the head mounting plate, it results that the range of the vertical position adjustment of the magnetic head is increased.

SUMMARY OF THE INVENTION

The object of the present invention is to provide a mechanism of simple structure for adjusting the position of the magnetic head of a VTR, wherein the vertical position adjustment means performs the adjustment with high precision without affecting the horizontal position adjustment means.

In order to achieve the object of the present invention, a mechanism for adjusting the position of the magnetic head of a VTR, as expressed in claim 1 of the appended claims, is characterized in that the horizontal position adjustment means comprise a horizontal position adjustment body rotatable relative to a chassis about an axis parallel to a supporting shaft and having the peripheral surface thereof parallel to the axis, the distance between the peripheral surface and the axis being gradually changed with the rotational direction of the horizontal position adjustment body; and a resilient means for resiliently pressing a portion of a up/down movable plate on the peripheral surface of the horizontal position adjustment body.

Accordingly to another aspect of the present invention, as expressed in claim 2, the mechanism for adjusting the position of the magnetic head is characterized in that the sleeve consists of a cylindrical member of a synthetic resin having an inner end surface and mounted on the up/down movable plate, a compression spring of the vertical position adjustment means is compressedly interposed between the inner end surface and the supporting shaft, and the vertical position adjustment screw is threadedly engaged with the supporting shaft through a screw insert opening formed int eh center of the inner end surface.

In the case of claim 1, if the horizontal position body is pivoted in a fixed range, the up/down movable plate accordingly pivots in a horizontal plane in a fixed range so that the distance between the magnetic head ad the rotation head cylinder is changed.

In the case of claim 2, if the vertical position adjustment screw is pivoted in a fixed range, the up/down movable plate moves upwardly or downwardly in the direction parallel to the axis of the supporting shaft so as to change the vertical position of the magnetic head.

BRIEF DESCRIPTION OF THE DRAWINGS

The present invention will now be described with reference to the drawings attached only by way of example in which.

DETAILED DESCRIPTION OF THE INVENTION

Figure 1:
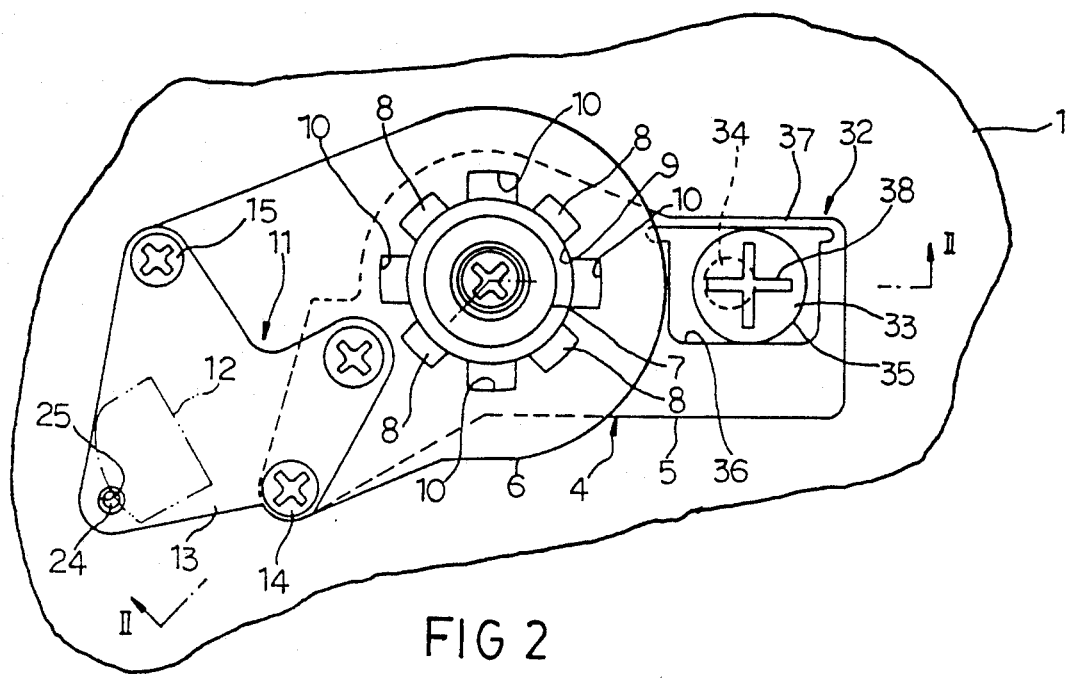
FIG. 1 illustrates a plane view of a mechanism for adjusting the position of the magnetic head of a VTR according to the present invention.
Figure 2:
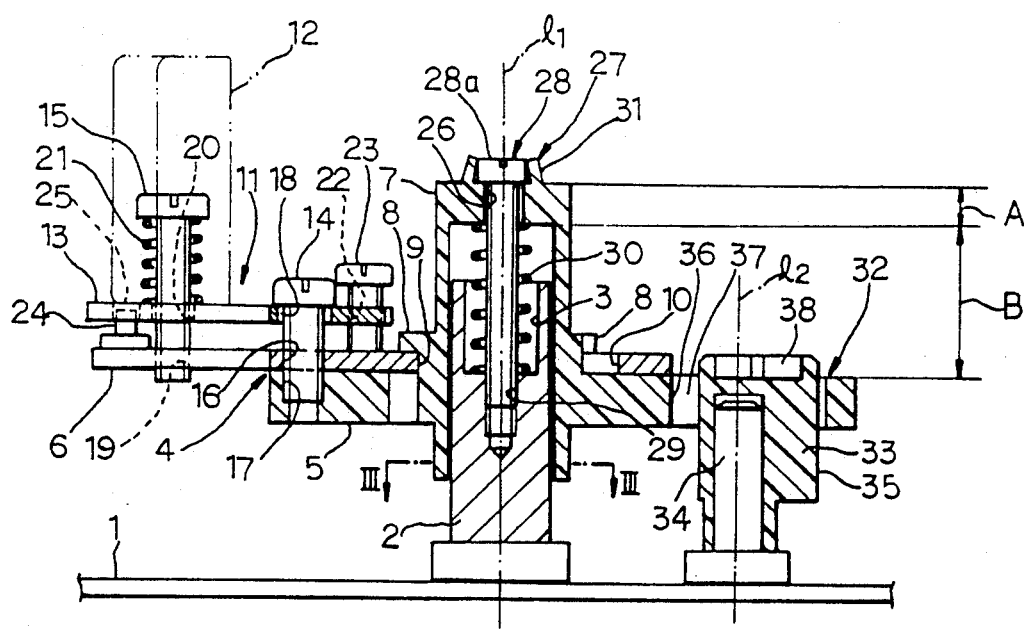
FIG. 2 is a cross-sectional view according to line II—II.

Referring FIGS. 1 and 2, supporting shaft 2 of circular cross-section in mounted on the upper surface of chassis 1 of a VTR, and a spring insert opening 3 is formed in the upper end portion of the supporting shaft 2. On the supporting shaft 2 is mounted an up/down movable plate 4 that may pivot about the axis $1_1$ of the supporting shaft 2 and move upwardly and downwardly in the direction parallel to the axis $1_1$. The up/down movable plate 4 comprises a main plate 5 of a synthetic resin and a surbordinate plate 6 of a metal. In the approximately central portion of the main plate 5 is integrally formed a sleeve 7 having an inner end surface that is extended upwardly and downwardly.

Figure 3:
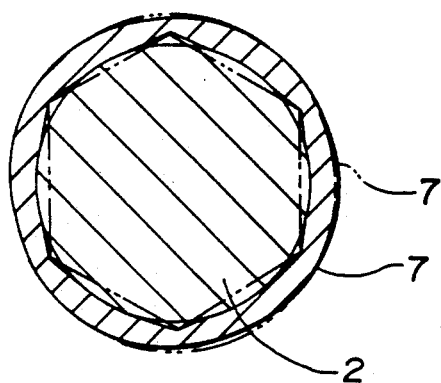
FIG. 3 is a cross-sectional view according to line III—III.
Figure 4:
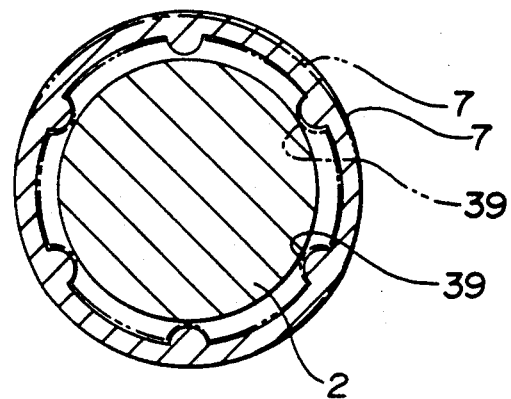
FIG. 4 is a cross-sectional view for illustrating the engagement between the head of the screw and the annular projection of the sleeve of FIG. 1.

The cross-sectional outline of the inner peripheral surface of the sleeve 7 forms a polygon (e.g., hexagon) to be in point contacts with the outer peripheral surface of the supporting shaft 2, as shown in FIG. 3. The outer peripheral surface of the sleeve 7 has a plurality of tongues (e.g. four tongues) 8 equidistantly arranged around the periphery thereof and positioned at a certain distance (by the thickness of the surbordinate plate 6) upwardly from the upper surface of the main plate 5. The subordinate plate 6 has a circular receiving hole 9, around whose periphery are formed a plurality of access openings 10 corresponding to the tongues 8 to pass them.

The receiving hole 9 of the surbordinate plate 6 receives the sleeve 7 of the main plate 5 so that the tongues 8 pass the corresponding access openings 10. Thereafter, the main plate 5 is rotated relative to the subordinate plate 6 so as to change the rotational position of the tongues 8 relative to the receiving hole 10, thereby interposing the subordinate plate 6 between the main plate 5 and the tongues 8.

The sleeve 7 is rotatably mounted on the supporting shaft 2 and upwardly and downwardly movable. At first, when the sleeve 7 receives the supporting shaft 2, it is resiliently expended into the state as shown by the solid liens in FIG. 3. Thus, the periphery of the supporting shaft 2 is tightly engaged with the inner periphery of the sleeve 7 so as to stabilize the up/down movable plate 4 relative to the supporting shaft 2.

On the up/down movable plate 4 is mounted the magnetic head 12 through a direction adjustment means 11 having a plate 13 for fixing the magnetic head thereon. The plate 13 is mounted over the subordinate plate 6 by means of mounting screw 14 and first adjustment screw 15, and movable upwardly and downwardly. The mounting screw 14 is threaded into first thread hole 16 of the subordinate plate 6, and into a hole 17 of the main pate 17 in a tapping manner, so that loosening of the mounting screw 14 is prevented. Moreover, the mounting screw 14 prevents the relative rotation between the main plate 5 and the subordinate plate 6. Also, the mounting screw 14 is received by first opening 18 of the plate 13. The first adjustment screw 15 is threaded into second thread hole 19 of the subordinate plate 6. The first adjustment screw 5 is received by second opening 20 of the plate 13. Between the head of the first adjustment screw 15 and the plate 13 is interposed spring 21 to bias the plate 13 downwardly. Into a thread hole 22 of the plate 13 is threaded second adjustment screw 23, whose lower end abuts the upper surface of the subordinate plate 6. Thus, in such a direction adjustment means 11, the direction of the magnetic head 12 relative to the tape contacting position and the position perpendicular thereto is adjusted by respectively rotating the second adjustment screw 23 and the first adjustment screw 15 in a fixed range. On the upper surface of the subordinate plate 6 is projected a guide pin 24 hat is received by an opening 25 of the plate. Thus, when the plate 13 is mounted over the subordinate plate 6, the positional arrangement of the openings is easily achieved.

In the inner end surface of the sleeve 7 is formed a screw insert hole 26 to receive a vertical position adjustment screw 28 of the vertical position adjustment means 27, whose end is threaded into thread hole 29 of the supporting shaft 2. As the screw 28 is pivoted in a fixed range, the up/down movable plate 4 moves upwardly and downwardly in the direction parallel to the axis 12 of the supporting shaft 2. The up/down movable plate 4 is biased upwardly by the compression spring 30 compressedly interposed between the inner end surface of the sleeve an the lower end of spring insert opening 3. The pressure of the compression spring 30 compresses the thickness A between the inner end surface of the sleeve 7 and the head 28a of the screw 28, so that the thickness A creeps, thus tending to become thin. However, the pressure of the compression spring 30 does not affect substantially the part B between the inner end surface of the sleeve 7 and the upper surface of the main plate 5, so that the vertical dimensional change of the magnetic head 12 due to the creep may be ignored.

On the outer end surface of the sleeve 7 is integrally formed an annular projection 31 tapering upwardly, whose inner diameter is designed to be smaller than the diameter of the head 28a of the screw 28. Thus, the head 28a of the screw 28 is forcedly fitted into the annular projection 31 so as to prevent loosening of the screw 28.

On the peripheral portion of the main plate 5 opposite to the portion having the magnetic head 12 is mounted horizontal position adjustment means 32 having a horizontal position adjustment body 33 of cylindrical shape. The horizontal position adjustment body 33 is made of a synthetic resin, and eccentrically and pivotably mounted on a mounting shaft 34 supported parallel to the supporting shaft 2 on the chassis 2. The peripheral surface 35 of the horizontal position adjustment body 33, as shown in FIG. 1, gradually moves away from the axis 12 of the mounting shaft 34 parallel to the axis $1_1$ of the supporting shaft 2, an is parallel to the axis 12 as shown in FIG. 2. The horizontal position adjustment body 33 is rotatably and slidably engaged with approximately rectangular opening 36 formed in the peripheral portion of the main plate 5 opposite to the portion having the magnetic head 12. One side of the opening 36 consists of a thin resilient membrane 37, by means of which the peripheral surface 35 of the horizontal position adjustment body 33 is resiliently held by the side surface of the opening 36. In the upper surface of the horizontal position adjustment body 33 is formed a cross-shaped tool insert groove 38. Though not shown in the drawings, a rotation head cylinder is mounted on the upper surface of the chassis 1.

Hereinafter will be describe in the operation of the inventive mechanism for adjusting the position of the magnetic head of a VTR. If the horizontal position adjustment body 33 is pivoted clockwise by inserting a tool in the insert groove 38 in FIG. 1, the up/down movable plate 4 is pivoted clockwise about the supporting shaft 2 together with the sleeve 7, and the magnetic head 12 is horizontally pivoted together with the up/down movable plate 4. Conversely, if the horizontal position adjustment body 33 is pivoted anti-clockwise, the up-down movable plate 4 is pivoted anti-clockwise about the supporting shaft 2 together with the magnetic head 12. Thus, the horizontal position of the magnetic head 12, i.e., the distance from the rotation head cylinder, is changed.

Meanwhile, if the screw 28 is rotated clockwise by inserting a tool in the insert groove in FIG. 1, the up/down movable plate 4 together with the sleeve 7 is moved downwardly parallel to the axis $1_1$ of the supporting shaft 2 against the force of the compression spring 30, and accordingly the magnetic head 12 is moved. Conversely, if the screw 28 is rotated anti-clockwise, the force of the compression spring 30 causes the sleeve 7 to move upwardly parallel to the axis 1₁ of the supporting shaft 2 together with the up-/down movable plate 4, and accordingly the magnetic head 12 is moved. Hence, the vertical position of the magnetic head 12 relative to the height of the tape running is changed.

Thus, it is similar to the conventional mechanism that the horizontal and the vertical positions of the magnetic head 12 is adjusted by respectively pivoting the horizontal position adjustment body 33 and the screw 28. However, the novel point of the present invention over prior art is that the peripheral surface of the horizontal position adjustment body 33 is parallel to the axis 1₁ of the supporting shaft 2 so that, if the vertical position of the magnetic head 12 is adjusted by pivoting the screw, the horizontal position of the magnetic head 12 is not changed.

Figure 5:
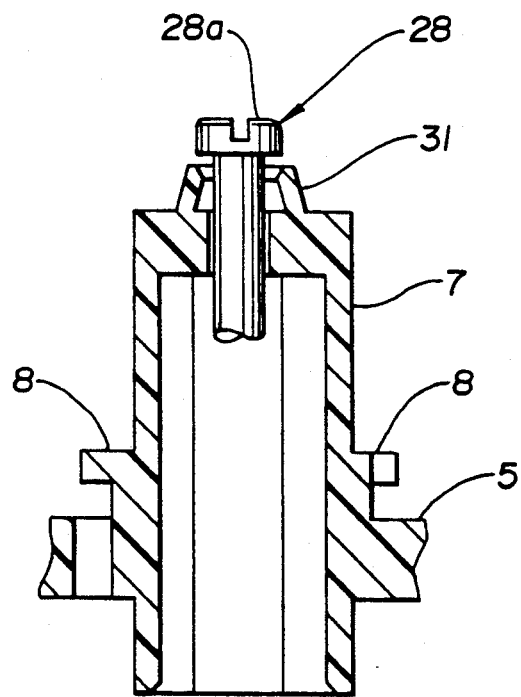
FIG. 5 is a view similar to FIG. 3 of another embodiment of the present invention.

In the embodiment described above, while the cross-sectional shape of the inner peripheral surface of the sleeve 7 is a polygon so as to contact the peripheral surface of the supporting shaft 2 in points, instead a plurality of ribs 39 have a semicircular cross-section may be projected on the inner peripheral surface of the sleeve 7 with an equal interval from each other along the peripheral direction, so as to contact the peripheral surface of the supporting shaft 2, as shown in FIG. 5.

Figure 6:
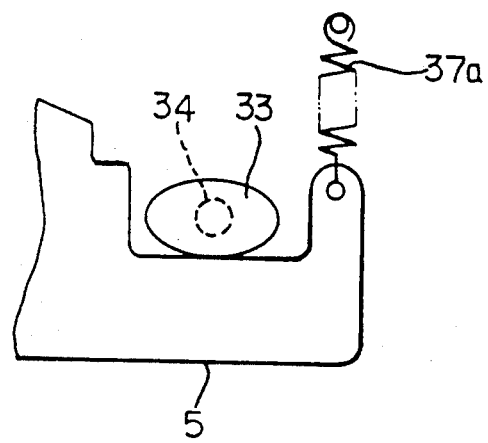
FIG. 6 is a plane view for illustrating the circumferential portion of the horizontal position adjustment body and the resilient means of a further embodiment of the present invention.

In addition, instead of the thin resilient membrane 37 on one side of the opening 36 integrally formed with the main plate 5, a separate spring 37a may be attached to the main plate 5 as shown in FIG. 6. Also, the horizontal position adjustment body 33 may be designed to have an elliptical cross-section, concentrically mounted on the shaft 34, as shown in FIG. 6.

Hence the present invention provides a mechanism for adjusting the position of the magnetic head with high precision that the operation of the vertical position adjustment means does not affect the horizontal position adjustment means.

What is claimed is:

1. A mechanism for adjusting the position of the magnetic head of a VTR, said magnetic head spaced a horizontal distance form a rotation head cylinder, the mechanism comprising:

an up/down movable plate having a sleeve engagingly fitting over a supporting shaft mounted on a chassis and a direction adjustment means for mounting said magnetic head;

a vertical position adjustment means for adjusting the vertical position of said up/down movable plate by means of a compression spring and a vertical position adjustment screw, said compression spring biasing said sleeve in a direction parallel to the vertical axis of said supporting shaft; and a horizontal position adjustment means for adjusting the horizontal distance between said magnetic head and said rotation head cylinder by rotating said up/down movable plate about said supporting shaft, wherein said horizontal adjustment means comprises:

a horizontal position adjustment body rotatable relative to the said chassis about an axis parallel to said supporting shaft and having a peripheral surface, the peripheral surface thereof parallel to said axis, the distance between said peripheral surface and said axis being gradually changed with the rotational direction of said horizontal position adjustment body; and a resilient means for resiliently pressing a portion of said up/down movable plate on the peripheral surface of said horizontal adjustment body.

2. A mechanism for adjusting the position of the magnetic head of a VTR, said magnetic head spaced a horizontal distance from a rotation head cylinder, the mechanism comprising:

an up/down movable plate having a sleeve engagingly fitting over a supporting shaft mounted on a chassis and direction adjustment means for mounting said magnetic head;

a vertical position adjustment means for adjusting the vertical position of said up/down movable plate by means of a compression spring and a vertical position adjustment screw, said compression spring biasing said sleeve in a direction parallel to the vertical axis of said supporting shaft; and a horizontal position adjustment means for adjusting the horizontal distance between said magnetic head and said rotation head cylinder by rotating said up/down movable plate about said supporting shaft, and wherein said sleeve consists of a cylindrical member of a synthetic resin having an inner end surface and mounted on said up/down movable plate, the compression spring of said vertical position adjustment means is compressedly interposed between said inner end surface and said supporting shaft, and said vertical position adjustment screw is threadably engaged with said supporting shaft through a screw insert opening formed in the center of is a inner end surface.

3. A mechanism for adjusting the position of the magnetic head of a VTR as set forth claim 2 comprising an annual projection forcibly fitting with the head of the screw so as to prevent loosening of the screw, and integrally formed in the outer end surface of the sleeve.

4. A mechanism as in claim 2 wherein said sleeve has a resiliently expandable inner surface providing plural point contacts with the supporting shaft.

* * * * *